United States Patent
Harithas (10) Patent No.: US 12,147,999 B2
(45) Date of Patent: *Nov. 19, 2024

(54) SYSTEMS AND METHODS TO PROCESS PAYMENTS FOR SUBSCRIBERSHIP WITHIN A MEMBERSHIP PLATFORM

(71) Applicant: PATREON, INC., San Francisco, CA (US)

(72) Inventor: Nikhil Purushottam Harithas, San Francisco, CA (US)

(73) Assignee: PATREON, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/334,026

(22) Filed: Jun. 13, 2023

(65) Prior Publication Data

US 2023/0325866 A1  Oct. 12, 2023

Related U.S. Application Data

(63) Continuation of application No. 17/341,130, filed on Jun. 7, 2021.

(51) Int. Cl.
*G06Q 20/10* (2012.01)
*G06Q 20/12* (2012.01)
(Continued)

(52) U.S. Cl.
CPC ......... *G06Q 30/0236* (2013.01); *G06Q 20/12* (2013.01); *G06Q 20/14* (2013.01); *G06Q 20/4014* (2013.01)

(58) Field of Classification Search
None
See application file for complete search history.

(56) References Cited

U.S. PATENT DOCUMENTS 7,921,028 B2   4/2011  Cole
8,051,040 B2  11/2011  Johnson
(Continued)

FOREIGN PATENT DOCUMENTS

JP   2019191623 A   10/2019
KR  20190119773 A   10/2019
WO   2009045899 A2   4/2009

OTHER PUBLICATIONS

Author(s) Rakesh Title: Personalized recommendations of twitter lists using content and network information Journal: AAAI [online]. Publication date: 2014. [retrieved on: Sep. 29, 2023]. Retrieved from the Internet: < URL: https://ojs.aaai.org/index.php/ICWSM/article/view/14558> (Year: 2014).

(Continued)

*Primary Examiner* — Joseph W. King
(74) *Attorney, Agent, or Firm* — Esplin & Associates, PC (57) ABSTRACT

Systems and methods are provided to process payments for subscribership within a membership platform. Exemplary implementations may: obtain benefit information for content creators of a membership platform; obtain payment processor information characterizing payment processing entities; obtain transaction information characterizing requested transactions between the content creators and the subscribers; determine which of the payment processing entities should process the requested transactions; execute the requested transactions using the payment processing entities; and/or perform other operations.

20 Claims, 4 Drawing Sheets

(51) Int. Cl.
  *G06Q 20/14* (2012.01)
  *G06Q 20/40* (2012.01)
  *G06Q 30/0207* (2023.01)

(56) References Cited

U.S. PATENT DOCUMENTS

| | | | |
|---|---|---|---|
| 8,375,024 | B2 | 2/2013 | Goeldi |
| 8,712,376 | B2 | 4/2014 | Strickon |
| 8,850,490 | B1 | 9/2014 | Thomas |
| 9,035,163 | B1 | 5/2015 | Mohajer |
| 9,060,249 | B2 | 6/2015 | Meredith |
| 9,558,277 | B2 | 1/2017 | Pappas |
| 9,734,521 | B2 | 8/2017 | Curtis |
| 9,767,208 | B1 | 9/2017 | Chow |
| 9,870,581 | B1 | 1/2018 | Vormweg |
| 10,356,574 | B1 | 7/2019 | Wood |
| 10,394,408 | B1 | 8/2019 | Freund |
| 10,607,242 | B1 | 3/2020 | Wood |
| 10,621,532 | B1 | 4/2020 | Conte |
| 10,936,986 | B2 | 3/2021 | Conte |
| 10,937,042 | B2 | 3/2021 | Wood |
| 11,049,191 | B1 | 6/2021 | Wilczek |
| 11,238,542 | B1 | 2/2022 | Wixted |
| 11,270,330 | B1 | 3/2022 | Brini |
| 2002/0036654 | A1 | 3/2002 | Evans |
| 2002/0103698 | A1 | 8/2002 | Cantrell |
| 2005/0087594 | A1* | 4/2005 | Phillips ............... G07G 5/00 235/379 |
| 2006/0053290 | A1* | 3/2006 | Randle .............. G06Q 20/027 713/153 |
| 2007/0038516 | A1 | 2/2007 | Apple |
| 2007/0069013 | A1 | 3/2007 | Seifert |
| 2007/0164554 | A1 | 7/2007 | Krone |
| 2008/0120185 | A1 | 5/2008 | Evans |
| 2008/0183577 | A1 | 7/2008 | Evans |
| 2008/0215467 | A1 | 9/2008 | Huffman |
| 2008/0243693 | A1 | 10/2008 | Thrasher |
| 2008/0265020 | A1 | 10/2008 | Copeland |
| 2009/0069911 | A1 | 3/2009 | Stefik |
| 2009/0158318 | A1 | 6/2009 | Levy |
| 2009/0234710 | A1 | 9/2009 | Belgaied Hassine |
| 2011/0258049 | A1 | 10/2011 | Ramer |
| 2011/0295722 | A1 | 12/2011 | Reisman |
| 2012/0054666 | A1 | 3/2012 | Baird-Smith |
| 2012/0179556 | A1 | 7/2012 | Ertas |
| 2012/0190386 | A1 | 7/2012 | Anderson |
| 2012/0272278 | A1 | 10/2012 | Bedi |
| 2012/0278725 | A1 | 11/2012 | Gordon |
| 2012/0311462 | A1 | 12/2012 | Devecka |
| 2013/0080328 | A1 | 3/2013 | Royyuru |
| 2013/0197979 | A1 | 8/2013 | Han |
| 2013/0226691 | A1 | 8/2013 | Chatow |
| 2013/0275429 | A1 | 10/2013 | York |
| 2014/0025473 | A1 | 1/2014 | Cohen |
| 2014/0032326 | A1 | 1/2014 | Li |
| 2014/0058938 | A1 | 2/2014 | McClung, III |
| 2014/0067554 | A1 | 3/2014 | Heppding |
| 2014/0067702 | A1 | 3/2014 | Rathod |
| 2014/0122507 | A1 | 5/2014 | Zeng |
| 2014/0164049 | A1 | 6/2014 | Yakos |
| 2014/0164514 | A1 | 6/2014 | Eteminan |
| 2014/0214641 | A1 | 7/2014 | Acker, Jr. |
| 2014/0280121 | A1 | 9/2014 | Sharp |
| 2014/0324604 | A1 | 10/2014 | Munoz Torres |
| 2014/0366047 | A1 | 12/2014 | Thomas |
| 2015/0066189 | A1 | 3/2015 | Mulligan |
| 2015/0066675 | A1 | 3/2015 | Camelio |
| 2015/0161692 | A1 | 6/2015 | Tembo |
| 2015/0193889 | A1 | 7/2015 | Garg |
| 2015/0363899 | A1 | 12/2015 | Krause |
| 2016/0071058 | A1 | 3/2016 | Galuten |
| 2016/0080485 | A1 | 3/2016 | Hamedi |
| 2016/0124918 | A1 | 5/2016 | Ying |
| 2016/0189198 | A1 | 6/2016 | McKenzie |
| 2016/0210650 | A1 | 7/2016 | Sewell |
| 2016/0232480 | A1 | 8/2016 | Erez |
| 2016/0239807 | A1 | 8/2016 | Creighton |
| 2016/0357376 | A1 | 12/2016 | Carrigan |
| 2017/0017978 | A1 | 1/2017 | Wallace |
| 2017/0076348 | A1 | 3/2017 | Jennings |
| 2017/0083930 | A1 | 3/2017 | Nagaraj |
| 2017/0161794 | A1 | 6/2017 | Zhu |
| 2017/0337621 | A1 | 11/2017 | Peters |
| 2018/0040019 | A1 | 2/2018 | Gavlovski |
| 2018/0075147 | A1 | 3/2018 | Bagheri |
| 2018/0121973 | A1 | 5/2018 | Dimascio |
| 2018/0144052 | A1 | 5/2018 | Sayyadi-Harikandehei |
| 2018/0181964 | A1 | 6/2018 | Zagarese |
| 2018/0285933 | A1 | 10/2018 | Lee-Chan |
| 2018/0365709 | A1 | 12/2018 | Modani |
| 2019/0026280 | A1 | 1/2019 | Aviyam |
| 2019/0026782 | A1 | 1/2019 | McGrath |
| 2019/0164082 | A1 | 5/2019 | Wu |
| 2019/0290965 | A1 | 9/2019 | Oren |
| 2019/0361577 | A1 | 11/2019 | Burns |
| 2020/0007934 | A1 | 1/2020 | Ortiz |
| 2020/0020014 | A1 | 1/2020 | Jin |
| 2020/0089724 | A1 | 3/2020 | Zimovnov |
| 2020/0134696 | A1 | 4/2020 | Lardeux |
| 2020/0219025 | A1 | 7/2020 | Conte |
| 2020/0219114 | A1 | 7/2020 | Wood |
| 2020/0300538 | A1 | 9/2020 | Avakian |
| 2020/0311751 | A1 | 10/2020 | Shi |
| 2020/0320571 | A1 | 10/2020 | Singh |
| 2020/0351561 | A1 | 11/2020 | Spencer |
| 2021/0133651 | A1 | 5/2021 | Conte |
| 2021/0133775 | A1 | 5/2021 | Wood |
| 2021/0158317 | A1 | 5/2021 | Kurylko |
| 2021/0192460 | A1 | 6/2021 | Xu |
| 2021/0216976 | A1 | 7/2021 | Kaufman |
| 2022/0156781 | A1 | 5/2022 | Brini |
| 2022/0277356 | A1 | 9/2022 | Russo |
| 2022/0318704 | A1 | 10/2022 | Brini |
| 2022/0377399 | A1 | 11/2022 | Bonner |
| 2023/0153840 | A1 | 5/2023 | Wood |
| 2023/0162118 | A1 | 5/2023 | Conte |
| 2023/0206154 | A1 | 6/2023 | Brini |
| 2023/0245162 | A1 | 8/2023 | Thomas |
| 2023/0252097 | A1 | 8/2023 | Church |

OTHER PUBLICATIONS

Author(s):Osuala Title: Impact of subscription based crowdfunding on creators online channels Journal: ERF [online]. Publication date: 2019. [retrieved on: Feb. 23, 2023 ]. Retrieved from the Internet: < URL: https://aisel.aisnet.org/cgi/viewcontent.cgi?article=1017& context=amcis2019> (Year: 2019).

Content and conduit: Relative profitability in the new era of television Todreas, Timothy Michael. ProQuest Dissertations and Theses, ProQuest Dissertations Publishing. (1996) (Year: 1996) 431 pages.

F. Cappa, S. Franco, E. Ferrucci and R. Maiolini, "The Impact of Product and Reward Types in Reward-Based Crowdfunding," Mar. 11, 2021, in IEEE Transactions on Engineering Management, 12 pages, doi: 10.1109/TEM.2021.3058309 (Year: 2021).

Gerri Detweiler, Reward Crowdfunding, Mar. 20, 2020, Nav, 11 pages, https://www.nav.com/business-financing-options reward-crowdfunding/ (Year: 2020).

Harris, William. "26 Inexpensive Customer Delight Ideas Worth Trying to Fuel Business Growth" Sellbrite, Jun. 2016, https://www.sellbrite.com/blog/customer-delight/( Year: 2016) 26 pages.

Hyken, Shep. "Seven Ways to Properly Give a Gift to Your Customers" Shep Hyken's Blog, Jun. 2016, https://hyken.com/internal-customers/seven-ways-properly-give-gift-customers/ (Year: 2016) 11 pages.

Investing in Games With Fig Game Shares,Feb. 28, 2019, fig.co, 12 pages, https://www.fig.co/invest#rewards-based-crowdfunding (Year: 2019).

Iulia, "9 social media apps paying their content creators", May 16, 2021 (Year: 2021).

(56) References Cited

OTHER PUBLICATIONS

J. Lahann, M. Scheid and P. Fettke, "Utilizing Machine Learning Techniques to Reveal VAT Compliance Violations in Accounting Data," 2019 IEEE 21st Conference on Business Informatics (CBI), 2019, pp. 1-10, doi: 10.1109/CBI.2019.00008.

L. Xuefeng and W. Zhao, "Using Crowdfunding in an Innovative Way: A Case Study from a Chinese Crowdfunding Platform," 2018 Portland International Conference on Management of Engineering and Technology (PICMET), 2018, pp. 1-9, doi: 10.23919/ PICMET. 2018.8481838. (Year: 2018).

Lopez et al., A Recommender System Based on a Machine Learning Algorithm for B2C Portals; Published in: 2009 IEEE/WIC/ACM International Joint Conference on Web Intelligence and Intelligent Agent Technology Date of Conference: Sep. 15-18, 2009 (Year: 2009).

Massimiliano Barbi and Marco Bigelli, Crowdfunding practices in and outside the US, Jun. 2017, 47 pages, ResearchGate DOI: 10.1016/ j.ribaf.2017.05.013 (Year: 2017).

Mattison, David, "Reality Check for your Muses: Creativity and Business Innovation Resources", Searcher; Medford vol. 16, Iss. 10, (Nov./Dec. 2008): 16-21, 55-59. (Year: 2008).

Miller, Nicole. "Inside Buffer's Community Delight Headquarters: How and Why We Send Swag and What It All Costs" Buffer, Apr. 27, 2015, 23 pages, https://buffer.com/resources/community-delight/ (Year: 2015).

Ondrejka, Cory, "Escaping the gilded cage: User created content and building the metaverse", 49 N.Y.L. Sch. L. Rev. 81 (2004). (Year: 2004) (23 pages).

Perez, "Watchworthy's personalized TV recommendation app will help you find your next binge", Mar. 24, 2020 (Year: 2020).

Shipwire. "Marketing inserts" Shipwire support, Feb. 27, 2015, https://www.shipwire.com/w/support/marketing-inserts/ (Year: 2015) 9 pages.

Vanderhoef, II, Robert John, et al., "An Industry of Indies: The New Cultural Economy of Digital Game Production", University of California, Santa Barbar, Sep. 2016, pp. 1-259. (Year: 2016).

Wilson et al., Real World Applications of Machine Learning Techniques over Large Mobile Subscriber Datasets, SE4ML: Software Engineering for Machine Learning , 9 pages, ARXIV ID: 1502. 02215 Publication Date: Feb. 8, 2015 (Year: 2015).

Yarbro, Printify Vs. Printful: Pros and Cons, Dec. 9, 2019, nomadicwander, https://nomadicwander.com/2019/12/09. printify-vs-printful-pros-and-cons/ (Year:2019) 10 pages.

Fischer, "Ad models break everyone's brains': How Patreon and Substack are trying to make the internet a better place with membership and subscriptions" (Aug. 11, 2019) (Year: 2019).

"Aatish—A New Profile-Based Recommendation Services for Mobile Telecom Network Subscribers". IEEE. 2015. (Year: 2015).

Masters of media, Substack: Against the advertising model, 2019 (Year: 2019).

Shariatmadari, Ali. "Data Dissemination using Information-Centric Networking." Order No. 10194046 University of Toronto (Canada) , 2016. Ann Arbor (Year: 2016).

Han, "Online contents funding system and method based upon matching with contents creator and investor", Translation of KR Pub No. 20190119773 A (2019) (Year: 2019) 15 pages.

* cited by examiner

SYSTEMS AND METHODS TO PROCESS PAYMENTS FOR SUBSCRIBERSHIP WITHIN A MEMBERSHIP PLATFORM

FIELD

The disclosure relates to systems and methods to process payments for subscribership within a membership platform.

BACKGROUND

Different platforms may be utilized by entities seeking contributions from the general public to obtain a needed service(s) and/or resource(s). Some of these platforms facilitate raising resources (i.e., funds) from the users through monetary contributions or donations to support a project. Oftentimes, supporters of a project are given rewards or special perks, where the size and/or exclusivity of the rewards or special perks may depend on the amount contributed.

SUMMARY

A membership platform may be comprised of users including one or more of content creators, subscribers, and/or other users. Content creators may be users of the membership platform who offer content (also referred to as "benefit items") to subscribers. A "benefit item" may refer to a good and/or service. A good may comprise a physical good and/or a digital good (e.g., "online" content). In some implementations, subscribers may donate funds to a content creator such that the benefit item may be the altruism in supporting the content creator. Subscribers may be users of the membership platform who subscribe, through payment of a one-time and/or recurring (e.g., monthly) fee, to one or more content creators. A subscriber of an individual content creator may obtain access to benefit items offered through the membership platform by virtue of being a subscriber to the individual content creator. A subscriber of an individual content creator may obtain preferential access to benefit items offered through the membership platform by virtue of being a subscriber to the individual content creator. Preferential access may refer to subscriber-only access to benefit items and/or other content. Preferential access may refer to tiered levels of access to benefit items and/or other content. Different levels of access may offer different quantities, content types, and/or combinations of benefit items. Different levels may correspond to different amounts of consideration paid by the given subscriber. In some implementations, other users of the membership platform may obtain limited access to benefit items. In some implementations, other users may be non-paying users and/or one-time visitors to the membership platform.

Given the amount of content creators, subscribers, and the many different types of content, membership platforms generally work with many payment processors to process a relatively high volume of payment. Different payment processors may have different restrictions on which transactions are processable. These restrictions may be based on the geographical location of the subscriber, the content the subscriber is subscribing to, the size of the transactions, and/or other information. Payment processors may reject transactions because of these restrictions, resulting in potential time and monetary losses. Accordingly, there is a need to determine which payment processors are best suited to execute certain transactions. The present disclosure addresses one or more of these problems in processing transactions through one or more payment processors.

One aspect of the present disclosure relates to process payments for subscribership within a membership platform. The system may include one or more hardware processors configured by machine-readable instructions and/or other components. The machine-readable instructions may include one or more computer program components. The computer program components may include one or more of an information component, a determination component, a transaction component, and/or other computer program components.

The information component may be configured to obtain benefit information for content creators of a membership platform and/or other information. The benefit information may characterize benefit items offered by the content creators to subscribers of the membership platform who subscribe to the content creators in exchange for consideration. By way of non-limiting illustration, the benefit information may characterize a first benefit item offered by a first content creator.

The information component may be further configured to obtain payment processor information and/or other information. The payment processor information may characterize payment processing entities. The payment processing entities may be configured to process transactions of payments of the consideration by the subscribers in exchange for subscribership to the content creators, through which the subscribers may receive the benefit items offered by the content creators. The payment processing entities may be characterized based on transaction criteria required to be satisfied in order for the payment processing entities to successfully process the transactions and/or other information. By way of non-limiting illustration, the payment processor information may characterize a first payment processing entity based on a first set of transaction criteria, and a second payment processing entity based on a second set of transaction criteria.

The information component may be configured to obtain transaction information and/or other information. The transaction information may characterize requested transactions between the content creators and the subscribers. The requested transactions may include the payments of the consideration by the subscribers in exchange for the subscribership to the content creators to receive the benefit items offered by the content creators. By way of non-limiting illustration, the transaction information may characterize a first requested transaction between the first content creator and a first subscriber, and a second requested transaction between the first content creator and a second subscriber.

The determination component may be configured to determine which of the payment processing entities should process the requested transactions. The determination may be based on the requested transactions satisfying the transaction criteria of the payment processing entities. By way of non-limiting illustration, the determination component may, responsive to the first requested transaction satisfying the first set of transaction criteria, determine the first payment processing entity should process the first requested transaction. By way of non-limiting illustration, the determination component may, responsive to the second requested transaction satisfying the second set of transaction criteria, determine the second payment processing entity should process the second requested transaction.

The transaction component may be configured to execute the requested transactions using the payment processing entities determined to have the transaction criteria satisfied. In some implementations, executing the requested transactions using the payment processing entities may include effectuating communication of transaction instructions to the payment processing entities. By way of non-limiting illustration, the first requested transaction may be executed via the first payment processing entity, and the second requested transaction may be executed via the second payment processing entity.

As used herein, any association (or relation, or reflection, or indication, or correspondence) involving servers, processors, remote computing platforms, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Some entities may seek to obtain funds through subscriptions. Such entities may utilize online membership platforms that allow consumers to sign up for ongoing payments in exchange for rewards and/or other membership benefits. Entities seeking funding may be content creators, for example, artists, musicians, educators, speakers, etc. Content creators may create content, which may refer to one or more of information, experiences, products, and/or other content provided to an audience or end-user, whether it be digital, analog, virtual, and/or other form. For example, types of content may include but is not limited to online content such as video content, podcasts, photographic art, webcomics, do-it-yourself crafts, digital music, performance art, and/or other types of content. Content creators may utilize membership platforms that allow consumers to become subscribers of the content creator. As subscribers, consumers may contribute or donate money to a content creator on a recurring (e.g., weekly or monthly) basis and/or per piece of content created by the content creator. Content creators may interact with subscribers and/or prospective subscribers (e.g., consumers that show interest in the content created by content creators) in a variety of ways.

Membership platforms, generally, work with payment processors to process a relatively high volume of payments, give the amount of content creators, subscribers, and the many different types of content. Different payment processors may have different restrictions on which transactions are processable. Different payment processors may define restrictions in their terms of service (TOS) contracts. These contracts may dictate information such as which types of content they are willing to process transactions for, which types of content may be processed faster, which types of content may be processed cheaper, and/or which types of content may require more fees or may come up against more "red tape". The present disclosure addresses one or more of these problems in processing transactions through one or more payment processors.

Figure 1:
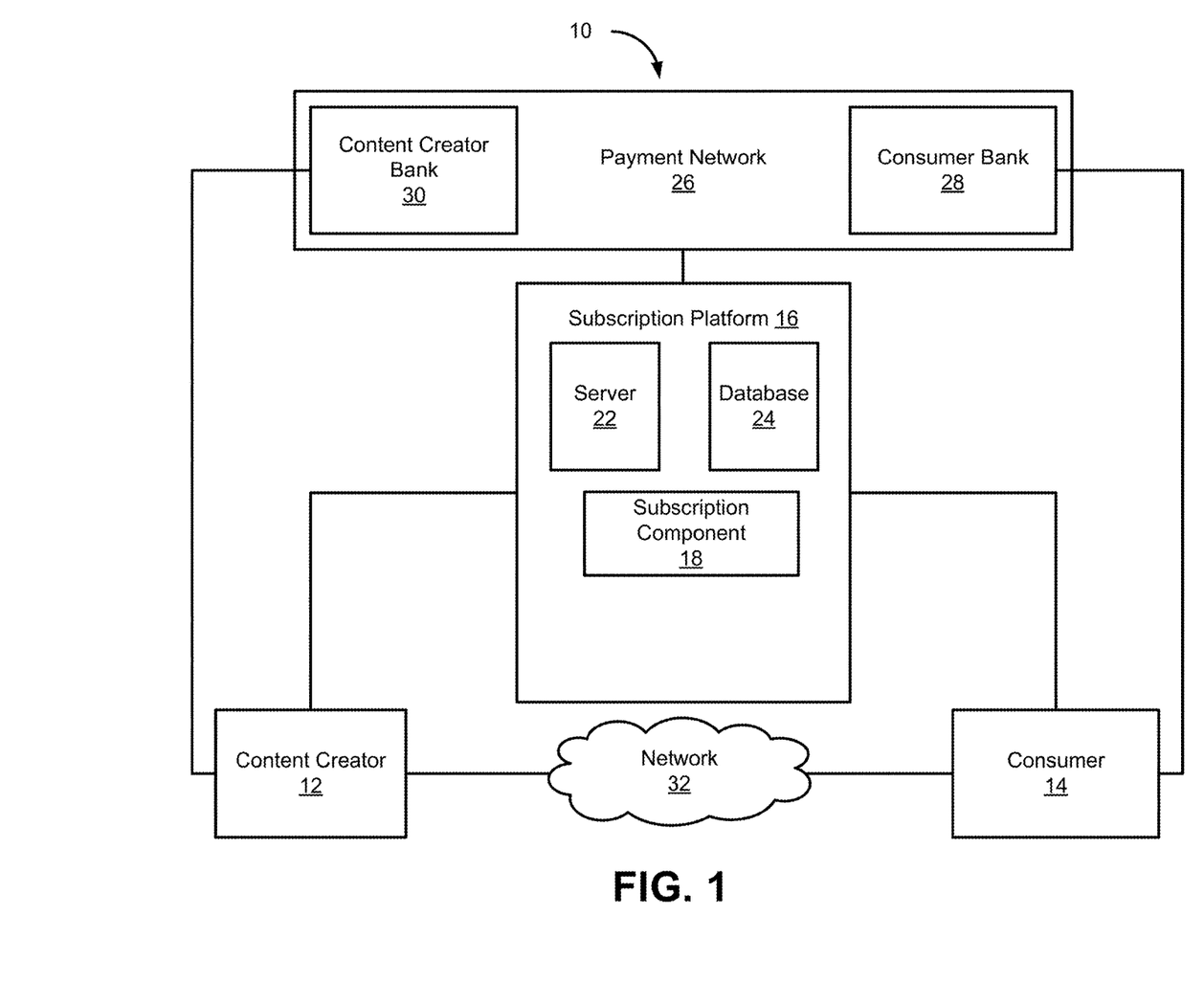
FIG. 1 illustrates an example membership system.

FIG. 1 illustrates an example subscriber-based membership system 10 (sometimes referred to herein as a "membership platform"). A content creator 12 may register and set up a creator account with subscription platform 16. Content creator 12 may create a page on a website hosted by server 22 of subscription platform 16 and input relevant information. Content creator 12 may input information associated with and/or relevant to content creator 12 via subscription component 18, such as creation information, benefit information, subscribership information, subscription level information specifying desired and/or initial subscription levels, preferred revenue source information (e.g., preferred currency, currency source, and/or other information), and/or other information. A page created by content creator 12 may be built using such information to make potential consumers aware of how content creator 12 may wish to be supported/receive support for his/her content creation in addition to subscribership revenue. Content creator 12 may set up a content creator account with subscription platform 16 through subscription component 18 or another appropriate component allowing content creator 12 to register with subscription platform 16. Various types of information regarding content creator 12 may be input into subscription platform 16, some of which may be information identifying content creator 12.

Consumer 14 (also referred to as a "subscriber" after subscribership is achieved) may set up a subscriber account with subscription platform 16. In setting up the subscriber account, consumer 14 may input demographic information relevant to consumer 14 (e.g., age, income, job, locale, etc.), and/or other information. Information identifying consumer 14 (e.g., name, a picture, a phone number, etc.) and/or other information may be input by consumer 14 when setting up the subscriber account. Through the page created by content creator 12, a consumer 14 may pledge to donate a given amount of money to content creator 12 every time content creator 12 creates content. For example, if content creator 12 is an artist, consumer 14 may pledge to donate ten dollars each time content creator 12 creates a piece of art.

In order to remit payment to content creator 12, consumer 14 may set up a payment mechanism through subscription platform 16 as part of setting up his/her subscriber account. When subscription platform 16 is notified or determines that content creator 12 has created content, subscription platform 16 may access payment network 26 to obtain and/or transfer the pledged amount from consumer bank 28 to content creator bank 30. It is noted that although the term "bank" is used, these components may comprise one or more of banking information, credit and/or debit card information, accounts through which only payments can be made, and/or other entities beyond a traditional "bank." Alternatively (or in addition to per content pledge donations), consumer 14 may pledge to donate a given amount to content creator 12 on a recurring basis through subscription platform 16. For example, consumer 14 may pledge to donate five dollars each month to content creator 12, where each month, subscription platform 16 may access payment network 26 to obtain and transfer the pledged amount from consumer bank 28 to content creator bank 30. It should be understood that consumer 14 may have an established relationship with consumer bank 28, and that content creator 12 may have an established relationship with content creator bank 30. It should be noted that subscription platform 16 may retain a portion, such as some percentage, of the pledged amount, as a fee for hosting the page created by content creator 12, providing payment services, etc.

In some implementations, payment network 26 may include and/or may have access to one or more payment processing entities. A payment processing entity may comprise an entity (e.g., business) that handles transactions so that customers can submit payments in exchange for subscribership and/or created content. That means the payment processing entity may communicate and/or relay information between content creator bank 30 and consumer bank 28. By way of non-limiting illustration, payment network 26 may comprise payment gateway that connects the payment processor entities, the content creator accounts, and/or consumer accounts.

As consideration for the pledged donations, content creator 12 may provide some type of preferential access to consumer 14 in the form of benefit items including online content, physical content, and/or other content. Content creator 12 may specify tiers of preferential access based upon the amount of money consumer 14 pledges to donate and/or depending on whether the pledged donation is a recurring donation or a per content donation. The amounts and/or types of pledged donations that may be made by consumer 14 to back content creator 12 may be referred to as subscription levels.

For example, in return for a monthly, recurring dollar amount of donation, content creator 12 may provide a high-resolution digital image of the artwork created during that month to consumer 14. In exchange for a weekly, recurring dollar amount of donation, content creator 12 may provide a high-resolution digital image of the artwork created during that month as well as a time-lapse video of content creator 12 creating the artwork. In exchange for another dollar amount per content donation, content creator 12 may provide a low-resolution digital image of the artwork. For another dollar amount per content donation, content creator 12 may engage in a live webchat or live meet-and-greet with consumer 14. Various types of preferential access may be provided by content creator 12 to consumer 14, and content creator 12 may specify the subscription level to preferential access correlation.

The preferential access may be provided to consumer 14 from content creator 12. For example, content creator 12 may email digital copies of artwork to consumer 14 over a communications network, such as a local area network (LAN), a wide area network (WAN), a wireless network (e.g., WiFi), a mobile communication network, a satellite network, the Internet, fiber optic, coaxial cable, infrared, radio frequency (RF) or any other suitable network. The preferential access may be provided to consumer 14 from content creator 12 via subscriber platform 16. For example, the live webchat between content creator 12 and consumer 14 may be provided through some chat functionality of the page of content creator 12 hosted on server 22 of subscription platform 16, which may reside on communications network 32 or on another network (not shown).

It should be noted that not all subscription levels are necessarily associated with preferential access. Some consumers may be driven to subscribe to content creator 12 on the basis of created content rather than any special perks or rewards.

The specification and management of subscriptions on behalf of content creator 12 may be handled by subscription component 18 alone or in conjunction with database 24. For example, a user interface may be provided via subscription component 18 allowing content creator 12 to specify his/her desired subscription levels and corresponding preferential access, as well as his/her preferred sources of revenue. Subscription component 18 may receive the information input by content creator 12 and transmit the information for storage as one or more records, matrices, or other data structures in database 24 or within memory local to subscription component 18. Database 24 or the local memory of subscription component 18 may be configured in a suitable database configuration, such as a relational database, a structured query language (SQL) database, a distributed database, an object database, etc. Suitable configurations and database storage types will be apparent to persons having skill in the relevant art.

Content creator 12 may be associated with one or more of subscribership information, benefit information, creator profile information, creation information, and/or other information. The content creator 12 may be able to change (e.g., add, delete, update, modify, etc.) such information. Such changes may be input via subscription component 18 and reflected in its local memory and/or database 24. It should be understood that content creator 12 and/or consumer 14 may be an individual or some entity representative of an individual or group of individuals.

Benefit information may characterize benefit items that content creator 12 creates. The benefit information may include information defining and/or describing one or more of the type of benefit items, the medium in which the benefit items are created and/or presented, the amount of benefit items created, the frequency at which the benefit items are created, age-appropriateness level of the benefit items, legality of the benefit items, and/or other information. For example, type of benefit items and/or medium may indicate that content creator 12 creates paintings on canvas, develops video games for a mobile platform, performs in online musical performances, and/or other information. Amount may reflect that content creator 12 created a series of artwork comprising four paintings. Content frequency information may indicate that content creator 12 develops three video games over the course of six months. Such information may be stored in content database 24. The legality of the benefit items may include considerations with respect to one or more of jurisdiction, government, agency, and/or other information. Age-appropriateness level of the benefit items may include considerations that are either subjective or objective. By way of non-limiting illustration, a content creator may subjectively specify a range of ages they feel is appropriate for their content. By way of non-limiting illustration, a range of ages appropriate for content may be objectively specified (e.g., adult content for 18+ years of age consumers only).

In some implementations, subscribership information may characterize the subscribership of the individual subscribers to individual content creators. The subscribership information may include one or more of length of subscribership the individual subscribers to individual content creators, date of initial subscribership the individual subscribers to individual content creators, a subscription level the individual subscribers, rank among other subscribers to individual content creators, lifetime contribution amount the individual subscribers, identifying information of the individual subscribers, subscriber-initiated interactions, and/or other information. The identifying information of the individual subscribers may include one or more of name, username, demographics, email, and/or other information identifying an individual subscriber. The subscriber-initiated interactions may be characterized based on one or more of content of the interactions, form of the interactions, point in time of the interactions, and/or other information. The content of the interactions may include what was communicated. The form of interactions may indicate how the communication was made. By way of non-limiting illustration, communication may be made by one or more of chat, comments, posting of forum or message board, phone call, video chat, and/or other forms of communication.

Apart from providing preferential access to consumer 14, content creator 12 may engage with consumer 14 by interacting in a variety of ways. For example, content creator 12 may communicate with consumer 14 over email, one or more social media platforms, a messaging platform or other appropriate communication mechanisms or methods. It should be understood that such communication platforms or mechanisms may be embodied in communications network 32 allowing content creator 12 and consumer 14 to communicate outside of subscription platform 16. It should be understood that communication platforms or mechanisms may operate in conjunction with subscription platform 16 such that one or more of their respective functionalities may be utilized through subscription platform 16. For example, social media hyperlinks allowing information from content creator 12's page may be provided on the webpage allowing content creator 12 to share content creation progress updates with consumer 14. For example, content creator 12 may respond to a communication from consumer 14 posted on a comment section provided on content creator 12's page in a private message or as part of the comment thread. It should be noted that content creator 12 may engage a single consumer, e.g., consumer 14, one-on-one and/or may engage a group of consumers. For example, content creator 12 may post a "public" comment on his/her webpage that may be seen by any consumer that is a subscriber to content creator 12 and/or any consumer that may be a potential subscriber.

Figure 2:
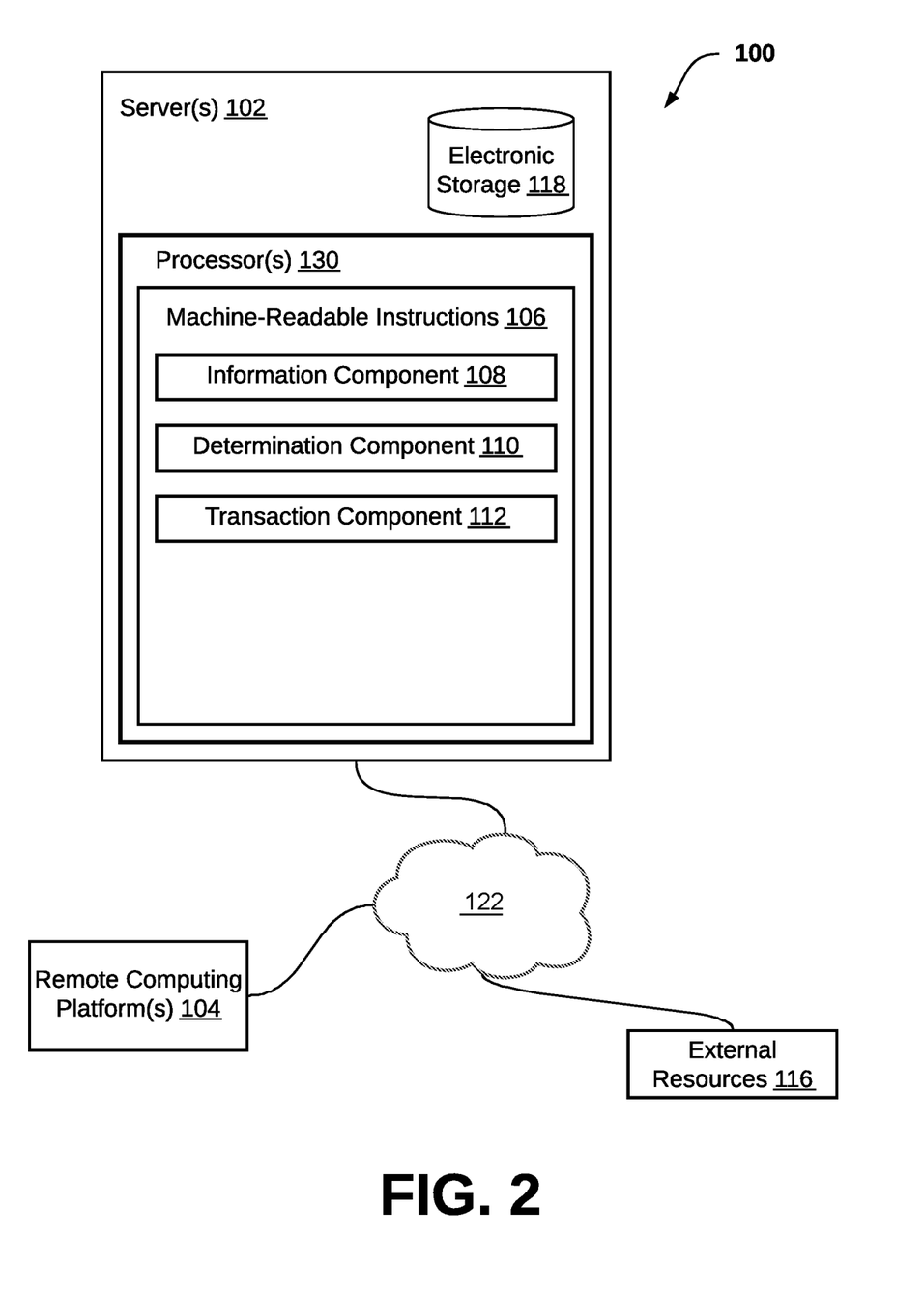
FIG. 2 illustrates a system configured to process payments for subscribership within a membership platform, in accordance with one or more implementations.

FIG. 2 illustrates a system 100 configured to process payments for subscribership within a membership platform. In some implementations, system 100 may include one or more of server(s) 102, remote computing platform(s) 104, one or more external resources 116, and/or other components. The terms remote computing platform, client computing platform, and/or computing platform may be used interchangeably herein to refer to individual ones of the remote computing platform(s) 104. Server(s) 102 may be configured to communicate with one or more remote computing platforms 104 according to a client/server architecture and/or other architectures via one or more network(s) 122. In some implementations, one or more network(s) 122 may include the Internet and/or other networks. Remote computing platform(s) 104 may be configured to communicate with other remote computing platforms via server(s) 102 and/or according to a peer-to-peer architecture, a client-server architecture, and/or other architectures. Users may access system 100 via remote computing platform(s) 104.

External resource(s) 116 may include sources of information outside of system 100, external entities participating with system 100, individual payment processing entities, and/or other resources. In some implementations, some or all of the functionality attributed herein to external resource(s) 116 may be provided by resources included in system 100.

It is noted the system 100 of FIG. 2 may be the same as, or included as part of, the system 10 shown in FIG. 1. For example, the server(s) 102 may be the same as or included in server 22. Network(s) 122 may be the same as or included in network 32. Individual remote computing platforms of one or more remote computing platforms 104 may be computing platforms utilized by content creator 12 and/or consumer 14 to access system 10 and/or system 100. Non-transitory electronic storage 118 may be the same as or included in database 24. Accordingly, those skilled in the art will recognize that although system 10 and system 100 are shown and described separately, they may comprise a single common system. However, in some implementations, the features and/or functionality of system 100 may be provided remotely as a separate system from system 10.

Server(s) 102 may be configured by machine-readable instructions 106. Machine-readable instructions 106 may include one or more computer program components. Executing the machine-readable instructions 106 may cause the one or more servers 102 to facilitate processing payments for subscribership within a membership platform. The computer program components may include one or more of an information component 108, a determination component 110, a transaction component 112, and/or other computer program components.

Information component 108 may be configured to obtain information utilized by within the system 100. The information may include one or more of benefit information, payment processor information, transaction information, and/or other information.

In some implementations, information component 108 may be configured to obtain benefit information for content creators of a membership platform. The benefit information may characterize benefit items offered by the content creators to subscribers of the membership platform who subscribe to the content creators in exchange for consideration. By way of non-limiting illustration, the benefit information may characterize a first benefit item offered by a first content creator.

In some implementations, information component 108 may be configured to obtain payment processor information. The payment processor information may characterize payment processing entities. The payment processing entities may be configured to process transactions of the payments of the consideration by the subscribers in exchange for subscribership to the content creators and/or payments of the consideration by the subscribers to receive individual benefit items offered by the content creators. The payment processing entities may be characterized based on transaction criteria and/or other information. The transaction criteria may include criteria required to be satisfied in order for the payment processing entities to successfully process (e.g., fulfill) the transactions. By way of non-limiting illustration, the payment processor information may characterize a first payment processing entity based on a first set of transaction criteria, and a second payment processing entity based on a second set of transaction criteria.

In some implementations, transaction criteria may include one or more of medium of the benefit items, age-appropriateness level of the benefit item, locale of the content creators, locale of the subscribers, legality of the benefit items, currency type of the content creator, currency type of the subscriber, and/or other information. The "locale" may include a place where a user lives. In some implementations, "locale" may be specified based on one or more of city, state, country, continent, jurisdiction, and/or other information.

In some implementations, information component 108 may be configured to determine the payment processor information by obtaining service guidelines of the payment processing entities and/or other information. The information component 108 may be configured to determine payment processing information by determining, from the service guidelines, the transaction criteria required to be satisfied in order for the payment processing entities to successfully process the transaction. In some implementations, service guidelines may include terms-of-service contracts specified by the payment processing entities and/or other information. The contracts may be digital word files, PDFs, and/or other formats. By way of non-limiting illustration, information component 108 may be configured to parse through service guidelines and extract information from the service guidelines and generate structured data sets. The structured data sets may comprise the transaction criteria.

In some implementations, payment processor information may further characterize the payment processing entities based on performance information and/or other information. The performance information may characterize the individual payment processing entities based on one or more of cost to process the transactions, latency in processing the transactions, likelihood of refusal, and/or other information. In some implementations, cost may include one or more of average cost, contracted cost, lowest cost, maximum cost, and/or other information. In some implementations, latency may refer to time delay in the fulfillment of the transaction after given instructions to process the transactions. In some implementations, likelihood of refusal may include a probability measure that a given transaction will not be fulfilled. In some implementations, a likelihood may be determined for different transactions (e.g., including but not limited to different content creators, subscribers, benefit items, amounts, currency type, etc.).

In some implementations, information component 108 may be configured to monitor the processing of the transactions by the payment processing entities. In some implementations, information component 108 may be configured to generate the performance information and/or other information based on monitoring. In some implementations, information component 108 may be configured to analyze historical performance information (e.g., information about transactions previously fulfilled) to determine the performance information for an individual payment processing entity.

In some implementation, information component 108 may be configured to obtain a preference hierarchy for the performance information. In some implementations, the preference hierarchy may include a preference order related to what information in the performance information may be most preferred (and/or least preferred) for a given transaction. The preference hierarchy for the performance information may provide a way to have fallback positions on determining which payment processing entity should be used to process transactions in the event that a transaction is unable to be processed. For example, the preference order may be specified for the cost to process the transactions, the latency in processing the transactions, the likelihood of refusal, and/or other performance information. By way of non-limiting illustration, one of the cost to process the transactions, the latency in processing the transactions, the likelihood of refusal, or other performance information may be selected as a most preferred performance information. The preference order may then include a next preferred performance information within the preference hierarchy, a next preferred performance information within the preference hierarchy, and so on. By way of non-limiting illustration, a preference hierarchy may include a preference order that specifies that cost is the most preferred characterization of performance, likelihood of refusal is the next preferred characterization of performance, and latency is the least preferred characterization of performance. By way of non-limiting illustration, a preference hierarchy may include a preference order that specifies that latency is the most preferred characterization of performance, cost of refusal is the next preferred characterization of performance, and likelihood of refusal is the least preferred characterization of performance.

In some implementations, information component 108 may be configured to obtain transaction information and/or other information. The transaction information may characterize requested transactions between the content creators and the subscribers. The requested transactions may include the payments of the consideration by the subscribers in exchange for the subscribership to the content creators and/or to receive the benefit items offered by the content creators and/or other payments. The transaction information may characterize requested transactions based on one or more of medium of a benefit item offered (e.g., via the subscription and/or on a one-time basis), age-appropriateness level of a benefit item, locale of a content creator, locale of a subscriber, legality of a benefit item, and/or other information. By way of non-limiting illustration, the transaction information may characterize a first requested transaction between the first content creator and a first subscriber, and a second requested transaction between the first content creator and a second subscriber. The first requested transaction may be characterized by one or more of medium of the first benefit item, age-appropriateness level of the first benefit item, locale of the first content creator, locale of the first subscriber, legality of first benefit item, and/or other information. The second requested transaction may be characterized by one or more of medium of the first benefit item, age-appropriateness level of the first benefit item, locale of the first content creator, locale of the second subscriber, legality of first benefit item, and/or other information.

Determination component 110 may be configured to determine which of the payment processing entities should process the requested transactions based on the requested transactions satisfying the transaction criteria of the payment processing entities. Determination component 110 may compare the transaction information with the payment processor information to determine which (if any) of the transaction criteria within the payment processor information is/are satisfied by the transaction information. In some implementations, a payment processing entity may be selected to process a requested transaction in response to a threshold amount of the transaction criteria being satisfied. In some implementations, the threshold amount may comprise all of the transaction criteria. In some implementations, the threshold amount may comprise a percentage of the transaction criteria. In some implementations, the percentage may include one or more of 90%, 80%, 70%, 60%, 50%, and/or other percentages. In some implementations, more than one payment processing entity may be determined to process a given transaction.

By way of non-limiting illustration, in response to the first requested transaction satisfying the first set of transaction criteria, determination component 110 may determine the first payment processing entity should process the first requested transaction. In response to the second requested transaction satisfying the second set of transaction criteria, determination component 110 may determine the second payment processing entity should process the second requested transaction.

In some implementations, determination component 110 may be configured to determine, from the payment processing entities that should process the requested transactions, which of the payment processing entities have the performance information that meets a performance threshold. The performance threshold may include one or more of a cost threshold to process the transactions, a latency threshold in processing the transactions, a likelihood of refusal threshold, and/or other thresholds. In some implementations, a threshold may specify a specific value and/or a range of values. By way of non-limiting illustration, a cost threshold may include a certain amount of a currency and/or range of amounts. By way of non-limiting illustration, a latency threshold may include a particular amount of time and/or range of time. By way of non-limiting illustration, a likelihood of refusal threshold may include a particular probability and/or range of probabilities.

In some implementations, determination component 110 may be configured to select the payment processing entities to execute the transactions. Selection of the payment processing entities may be based on the payment processing entities determined to have one or both of 1) the transaction criteria satisfied and/or 2) the most preferred performance information that meets the performance threshold. In some implementations, determination component 110 may be configured to, responsive to one or more failed attempts to process the transactions by the payment processing entities determined to have one or both of 1) the transaction criteria satisfied and/or 2) the most preferred performance information that meets the performance threshold, select an other one of the payment processing entities determined to have one or both of 1) the transaction criteria satisfied and/or 2) a next preferred performance information that meets the performance threshold. The next preferred performance information may be determined from the preference order.

Transaction component 112 may be configured to execute the requested transactions using the selected payment processing entities. In some implementations, executing the requested transactions using the payment processing entities may include effectuating communication of transaction instructions to the payment processing entities. The transaction instructions may include the necessary information (e.g., transaction information and/or other information) in order for a payment processing entity to fulfill a transaction. By way of non-limiting illustration, information may be communicated from a subscriber bank and/or computing platform of a subscriber, routed to the payment processor entity, and deposited to a content creator bank and/or computing platform of a content creator. In some implementations, information may be routed through system 100, and/or a network external to the system 100 may be established to communicate the information. By way of non-limiting illustration, the first requested transaction may be executed via the first payment processing entity, and the second requested transaction may be executed via the second payment processing entity.

Transaction component 112 may be configured to receive confirmation information from the payment processing entities. The confirmation information may include one or more an indication that a transaction was fulfilled, an indication that a transaction was denied, and/or other information. The confirmation information may be used during the monitoring of the payment processing entities to generate performance information.

In some implementations, server(s) 102, remote computing platform(s) 104, and/or external resource(s) 116 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, remote computing platform(s) 104, and/or external resource(s) 116 may be operatively linked via some other communication media.

A given remote computing platform 104 may include one or more processors configured to execute one or more computer program components. The computer program components may be configured to enable an expert or user associated with the given remote computing platform 104 to interface with system 100, system 10, and/or external resource(s) 116, and/or provide other functionality attributed herein to remote computing platform(s) 104. By way of non-limiting example, the given remote computing platform 104 may include one or more of a desktop computer, a laptop computer, a handheld computer, a tablet computing platform, a NetBook, a Smartphone, a gaming console, and/or other computing platforms.

Server(s) 102 may include electronic storage 118, one or more processors 130, and/or other components. Server(s) 102 may include communication lines, or ports to enable the exchange of information with a network and/or other computing platforms. Illustration of server(s) 102 in FIG. 2 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 118 may comprise non-transitory storage media that electronically stores information. The electronic storage media of electronic storage 118 may include one or both of system storage that is provided integrally (i.e., substantially non-removable) with server(s) 102 and/or removable storage that is removably communicable with server(s) 102 via, for example, a port (e.g., a USB port, a firewire port, etc.) or a drive (e.g., a disk drive, etc.). Electronic storage 118 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 118 may include one or more virtual storage resources (e.g., cloud storage, a virtual private network, and/or other virtual storage resources). Electronic storage 118 may store software algorithms, information determined by processor(s) 130, information received from server(s) 102, information received from remote computing platform(s) 104, and/or other information that enables server(s) 102 to function as described herein.

Processor(s) 130 may be configured to provide information processing capabilities in server(s) 102. As such, processor(s) 130 may include one or more of a digital processor, an analog processor, a digital circuit designed to process information, an analog circuit designed to process information, a state machine, and/or other mechanisms for electronically processing information. Although processor(s) 130 is shown in FIG. 2 as a single entity, this is for illustrative purposes only. In some implementations, processor(s) 130 may include a plurality of processing units. These processing units may be physically located within the same device, or processor(s) 130 may represent processing functionality of a plurality of devices operating in coordination. Processor(s) 130 may be configured to execute components 108, 110, and/or 112, and/or other components. Processor(s) 130 may be configured to execute components 108, 110, and/or 112, and/or other components by software; hardware; firmware; some combination of software, hardware, and/or firmware; and/or other mechanisms for configuring processing capabilities on processor(s) 130. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, and/or 112 are illustrated in FIG. 2 as being implemented within a single processing unit, in implementations in which processor(s) 130 includes multiple processing units, one or more of components 108, 110, and/or 112 may be implemented remotely from the other components. The description of the functionality provided by the different components 108, 110, and/or 112 described below is for illustrative purposes, and is not intended to be limiting, as any of components 108, 110, and/or 112 may provide more or less functionality than is described. For example, one or more of components 108, 110, and/or 112 may be eliminated, and some or all of its functionality may be provided by other ones of components 108, 110, and/or 112. As another example, processor(s) 130 may be configured to execute one or more additional components that may perform some or all of the functionality attributed below to one of components 108, 110, and/or 112.

Figure 3:
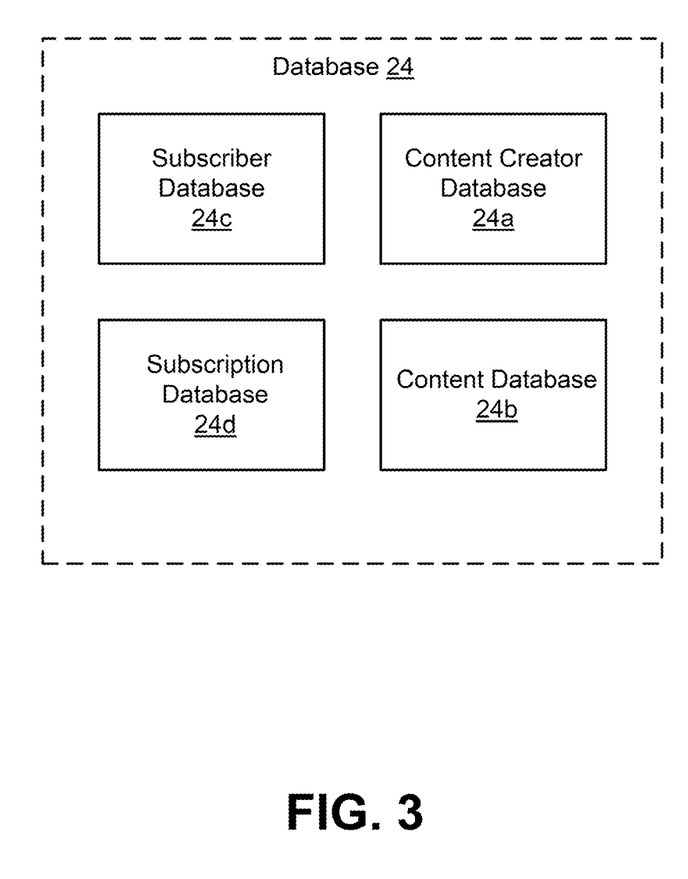
FIG. 3 illustrates an example database.

FIG. 3 illustrates elements that may make up database 24 of FIG. 1. As indicated previously, subscription component 18 of FIG. 1 may transmit information input by content creator 12 and/or consumer 14 regarding benefit information, subscribership information, and/or other information to database 24. Subscription platform 16, via server 22, for example, may monitor and obtain creation and/or subscribership information for storage in database 24. For example, subscription platform 16 may monitor and store additional information as well as performance-related subscribership information, e.g., engagement activity between content creator 12 and his/her subscribers, one of whom may be consumer 14. For example, subscription platform 16 of FIG. 1 may monitor the amount of money being generated and/or lost through the subscribers (e.g., outcome information), as well as content creator 12's subscriber retention rate. For example, subscription platform 16 may monitor and store performance-related creation information, such as the amount of content that content creator 12 is creating, how often and/or how quickly content creator 12 reacts to subscriber engagement activity, etc.

Database 24 may include one or more databases or partitions in which information relating to content creator 12, and/or subscribership relevant to content creator 12. For example, database 24 may include a content creator database 24a, a content database 24b, a subscriber database 24c, and a subscription database 24d. It should be noted that the elements and/or functionality of database 24 may be implemented in local memory resident in subscription component 18 or shared between database 24 and the local memory of subscription component 18 rather than solely in database 24.

Database 24 may be populated with one or more of benefit information, creator profile information, subscriber information, subscribership information, and/or other information.

Creator profile information characterizing content creator may be stored in content creator database 24a. The creator profile information may be information reflecting the creator type that content creator 12 designates him/herself to be and/or other self-identified preferences regarding subscription offerings by content creator 12. For example, content creator type may reflect that content creator may be a paint artist, a digital artist, a sculptor, a video game developer, a writer, a performance artist, etc. Content creator preferences may reflect subscription levels content creator 12 wishes to offer to subscribers. Content creator preferences may reflect, e.g., a desired minimum revenue, preferred sources of revenue, subscription level proportions, etc. For example, content creator preferences may include information indicating content creator's desire for more subscribers pledging some amount of money or less subscribers pledging a greater amount of money. For example, content creator preferences may include information specifying that content creator wishes to supplement his/her subscription-generated revenue with revenue generated from the sale of promotional merchandise.

In addition to content creation-related information, and upon registering with subscription platform as a content creator, content creator may input information characterizing the identity of content creator. For example, content creator may input or upload contact information, a telephone number associated with a personal user device, such as smartphone, a locale, an email address, a photograph, and/or other identifying information. Such identifying information may be used by subscription platform in a variety of ways to associate content creator with particular content, his/her webpage, payment of subscription donations, and/or other information.

Content database 24b may store instances of digital content and/or other information.

Consumers may subscribe to content creators by registering with subscription platform. During registration, consumers may input certain subscriber demographic information indicative of economic and/or social characteristics. Subscriber demographic information may reflect the yearly income of consumers, a geographic area in which consumer resides, the age of consumer, interests of consumer, etc. Subscriber information may include data regarding the amount of money consumer is currently pledged to donate to one or more content creators. Over time, as monitored and collected by subscription platform, subscriber information may include information regarding the amount of money consumer has previously donated to one or more content creators. Subscriber information, as monitored and obtained by subscription platform 16 may include an Internet Protocol (IP) address indicative of a current location of consumer 14 and/or an IP address indicating a payment source. Such information may be stored in subscriber database 24c.

Like content creators, consumers may input or upload other identifying information. For example, a photograph or phone number of a consumer may be used. Such information may be stored in subscriber database 24c.

Subscription level information may refer to information characterizing different subscription levels and corresponding preferential access information specified by content creators. For example, subscription level information may reflect that a ten dollar recurring donation is rewarded with a high-resolution digital image of artwork created during that month to consumers. Such subscriber level information may be stored in subscription database 24d. Subscribership information may be stored in subscription database 24d and/or other storage location.

It should be noted that other databases or partitions may make up database 24. For example, database 24 may include one or more databases or partitions for storing information including, but not limited to the following: preferential access information characterizing activity in which content creator engagements may refer to data reflecting the type of activity, the level and/or exclusivity of preferential access to that activity granted to consumer; subscriber and/or content creator engagement information characterizing interactions, the type and/or frequency of interactions between subscribers and content creators, and/or the medium over which interactions may occur; and historical subscription level and/or engagement information reflecting subscription level and/or engagement information monitored and gathered over one or more periods of time.

It should be noted that some of the information described above may not necessarily be required. It should be noted that information reflecting additional aspects of, e.g., the content, content creator, content creator preferences, and/or subscribership, is contemplated by the disclosure. For example, preferential access need not necessarily be offered for each subscription level. For example, subscriber data may include data reflecting particular content creators to which a subscriber pledges donations.

Figure 4:
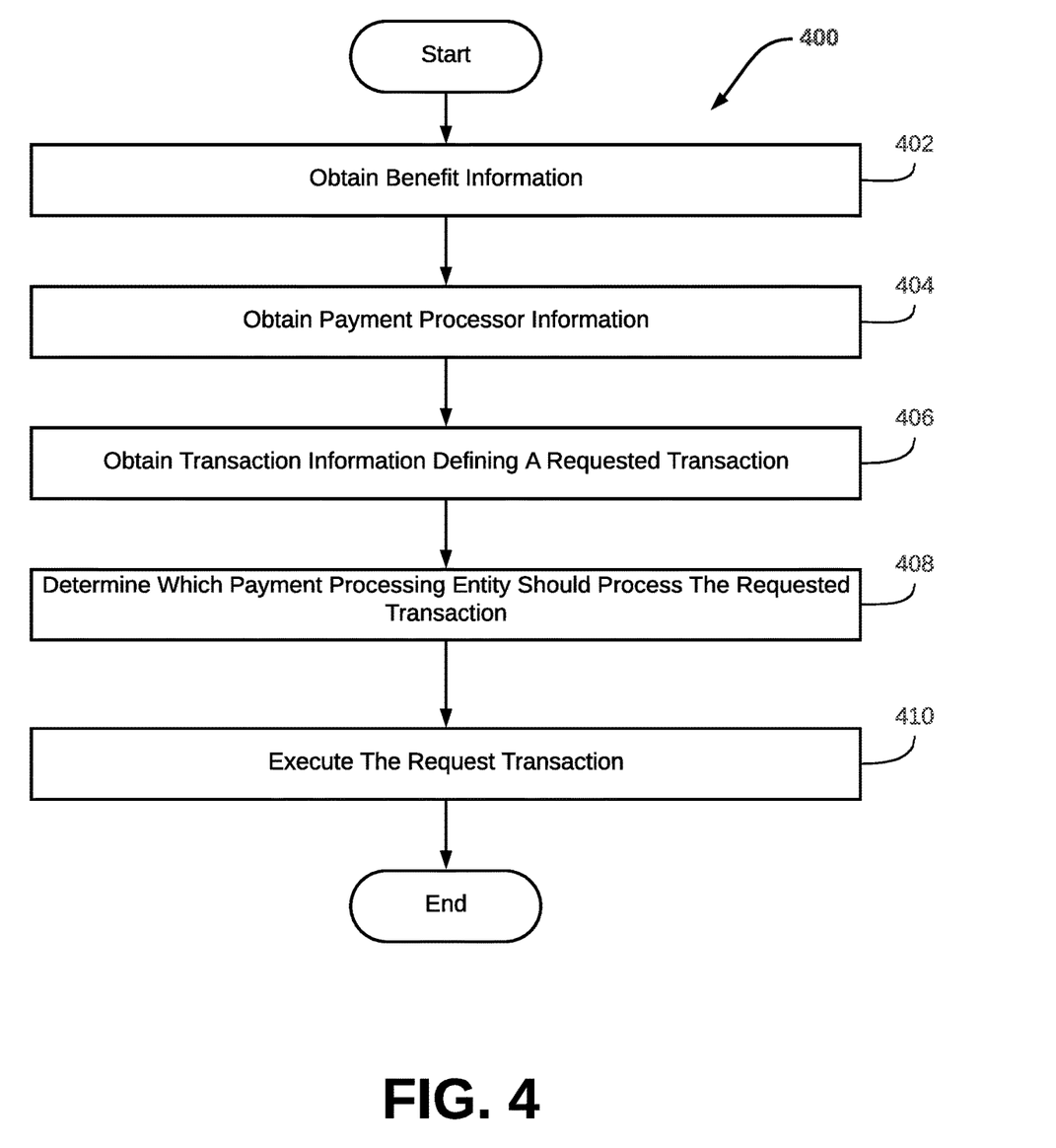
FIG. 4 illustrates a method to process payments for subscribership within a membership platform, in accordance with one or more implementations.

FIG. 4 illustrates a method 400 to process payments for subscribership within a membership platform, in accordance with one or more implementations. The operations of method 400 presented below are intended to be illustrative. In some implementations, method 400 may be accomplished with one or more additional operations not described, and/or without one or more of the operations discussed. Additionally, the order in which the operations of method 400 are illustrated in FIG. 4 and described below is not intended to be limiting.

In some implementations, method 400 may be implemented in one or more processing devices (e.g., a physical processor, digital processor, an analog processor, a digital circuit designed to process information, an analog circuit designed to process information, a state machine, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

An operation 402 may include obtaining benefit information and/or other information for content creators of a membership platform. The benefit information may characterize benefit items offered by the content creators to subscribers of the membership platform who subscribe to the content creators in exchange for consideration. By way of non-limiting illustration, the benefit information may characterize a first benefit item offered by a first content creator. Operation 402 may be performed by one or more hardware processors configured by machine-readable instructions including a component that is the same as or similar to information component 108.

An operation 404 may include obtaining payment processor information. The payment processor information may characterize payment processing entities. The payment processing entities may be configured to process transactions of payments of the consideration by the subscribers in exchange for subscribership to the content creators and to receive the benefit items offered by the content creators. The payment processing entities may be characterized based on transaction criteria required to be satisfied in order for the payment processing entities to successfully process the transactions. By way of non-limiting illustration, the payment processor information may characterize a first payment processing entity based on a first set of transaction criteria, and a second payment processing entity based on a second set of transaction criteria. Operation 404 may be performed by one or more hardware processors configured by machine-readable instructions including a component that is the same as or similar to information component 108.

An operation 406 may include obtaining transaction information. The transaction information may characterize requested transactions between the content creators and the subscribers. The requested transactions may include the payments of the consideration by the subscribers in exchange for subscribership to the content creators. By way of non-limiting illustration, the transaction information may characterize a first requested transaction between the first content creator and a first subscriber, and a second requested transaction between the first content creator and a second subscriber. Operation 406 may be performed by one or more hardware processors configured by machine-readable instructions including a component that is the same as or similar to information component 108.

An operation 408 may include determining which of the payment processing entities should process the requested transactions based on the requested transactions satisfying the transaction criteria of the payment processing entities. By way of non-limiting illustration, responsive to the first requested transaction satisfying the first set of transaction criteria, determining the first payment processing entity should process the first requested transaction, and, responsive to the second requested transaction satisfying the second set of transaction criteria, determining the second payment processing entity should process the second requested transaction. Operation 408 may be performed by one or more hardware processors configured by machine-readable instructions including a component that is the same as or similar to determination component 110.

An operation 410 may include executing the requested transactions using the payment processing entities determined to have the transaction criteria satisfied. By way of non-limiting illustration, the first requested transaction may be executed via the first payment processing entity, and the second requested transaction may be executed via the second payment processing entity. Operation 410 may be performed by one or more hardware processors configured by machine-readable instructions including a component that is the same as or similar to transaction component 112.

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system configured to determine which payment processor should be used to process a transaction based on transaction processing latency, the system comprising:
   one or more physical processors configured by machine-readable instructions to:
      manage, by a server, an online membership platform hosting content creators, the content creators offering subscribership to consumers in exchange for consideration such that acceptance of offers for subscribership through payments of the consideration causes the consumers to become subscribers to the content creators, wherein the consumers access the online membership platform through a user interface of the online membership platform;
      monitor, by the server, processing of transactions of the payments by a set of payment processing entities;
      generate, by the server, performance information for individual payment processing entities based on monitoring the processing of the transactions by the individual payment processing entities, the performance information for an individual payment processing entity comprising an individual transaction processing latency, such that a first payment processing entity is associated with a first transaction processing latency;
      obtain, by the server, transaction information characterizing requested transactions of the payments of the consideration, the requested transactions including a first requested transaction by a first consumer; and
      for an individual requested transaction, determine, by the server, which payment processing entity in the set of payment processing entities should process the individual requested transaction based on the individual transaction processing latency not exceeding a latency threshold and the individual requested transaction satisfying other criteria of the payment processing entity, such that:
         in response to the first transaction processing latency not exceeding the latency threshold and the first requested transaction satisfying a first set of other criteria of the first payment processing entity, determine the first payment processing entity should process the first requested transaction.

2. The system of claim 1, wherein the one or more physical processors are further configured by the machine-readable instructions to:
   facilitate, by the server, execution of the requested transactions using determined ones of the payment processing entities, such that execution of the first requested transaction is facilitated via the first payment processing entity; and
   responsive to execution of the requested transactions, provide the consumers who are now the subscribers to the content creators with access to creator pages of the content creators through which the subscribers realize their subscribership.

3. The system of claim 2, wherein facilitating execution of the requested transactions includes effectuating communication of transaction instructions to determined ones of the payment processing entities.

4. The system of claim 1, wherein the one or more physical processors are further configured by the machine-readable instructions to determine the other criteria based on individual service guidelines of the individual payment processing entities.

5. The system of claim 4, wherein a service guideline includes a terms-of-service contract.

6. The system of claim 1, wherein the performance information for the individual payment processing entity further comprises an individual transaction processing cost.

7. The system of claim 6, wherein the one or more physical processors are further configured by the machine-readable instructions to:
   determine, by the server and for the individual requested transaction, which payment processing entity in the set of payment processing entities should process the individual requested transaction further based on the individual transaction processing cost not exceeding a cost threshold.

8. The system of claim 7, wherein the one or more physical processors are further configured by the machine-readable instructions to:
   obtain a preference hierarchy, the preference hierarchy conveying whether less processing latency or less processing cost is relatively more preferred; and
   determine which payment processing entity in the set of payment processing entities should process the individual requested transaction based on the preference hierarchy.

9. The system of claim 8, wherein the one or more physical processors are further configured by the machine-readable instructions to:
   in response to failed attempts to process the requested transactions by the payment processing entities, select other ones of the payment processing entities based on the preference hierarchy.

10. The system of claim 1, wherein the one or more physical processors are further configured by the machine-readable instructions to:
    establish one or more network connections between the server and remotely located client computing platforms associated with the consumers;
    generate, by the server, information defining the user interface of the online membership platform;
    effectuate communication of the information defining the user interface of the online membership platform to the remotely located client computing platforms over the one or more network connections to cause the remotely located client computing platforms to present the user interface;
    obtain, by the server, user input information defining user input into the user interface of the online membership platform; and
    generate the requested transactions based on the user input.

11. A method to determine which payment processor should be used to process a transaction based on transaction processing latency, the method comprising:

managing, by a server, an online membership platform hosting content creators, the content creators offering subscribership to consumers in exchange for consideration such that acceptance of offers for subscribership through payments of the consideration causes the consumers to become subscribers to the content creators, wherein the consumers access the online membership platform through a user interface of the online membership platform;

monitoring, by the server, processing of transactions of the payments by a set of payment processing entities;

generating, by the server, performance information for individual payment processing entities based on monitoring the processing of the transactions by the individual payment processing entities, the performance information for an individual payment processing entity comprising an individual transaction processing latency, wherein a first payment processing entity is associated with a first transaction processing latency;

obtaining, by the server, transaction information characterizing requested transactions of the payments of the consideration, the requested transactions including a first requested transaction by a first consumer; and for an individual requested transaction, determining, by the server, which payment processing entity in the set of payment processing entities should process the individual requested transaction based on the individual transaction processing latency not exceeding a latency threshold and the individual requested transaction satisfying other criteria of the payment processing entity, including:

for the first requested transaction, in response to the first transaction processing latency not exceeding the latency threshold and the first requested transaction satisfying a first set of other criteria of the first payment processing entity, determining the first payment processing entity should process the first requested transaction.

12. The method of claim 11, further comprising:

facilitating, by the server, execution of the requested transactions using determined ones of the payment processing entities, including facilitating execution of the first requested transaction via the first payment processing entity; and responsive to execution of the requested transactions, providing the consumers who are now the subscribers to the content creators with access to creator pages of the content creators through which the subscribers realize their subscribership.

13. The method of claim 12, wherein the facilitating execution of the requested transactions includes effectuating communication of transaction instructions to determined ones of the payment processing entities.

14. The method of claim 11, further comprising determining the other criteria based on individual service guidelines of the individual payment processing entities.

15. The method of claim 14, wherein a service guideline includes a terms-of-service contract.

16. The method of claim 11, wherein the performance information for the individual payment processing entity further comprises an individual transaction processing cost.

17. The method of claim 16, further comprising:

for the individual requested transaction, determining, by the server, which payment processing entity in the set of payment processing entities should process the individual requested transaction further based on the individual transaction processing cost not exceeding a cost threshold.

18. The method of claim 17, further comprising:

obtaining a preference hierarchy, the preference hierarchy conveying whether less processing latency or less processing cost is relatively more preferred; and determining which payment processing entity in the set of payment processing entities should process the individual requested transaction based on the preference hierarchy.

19. The method of claim 18, further comprising:

in response to failed attempts to process the requested transactions by the payment processing entities, selecting other ones of the payment processing entities based on the preference hierarchy.

20. The method of claim 11, further comprising:

establishing one or more network connections between the server and remotely located client computing platforms associated with the consumers;

generating, by the server, information defining the user interface of the online membership platform;

effectuating communication of the information defining the user interface of the online membership platform to the remotely located client computing platforms over the one or more network connections to cause the remotely located client computing platforms to present the user interface;

obtaining, by the server, user input information defining user input into the user interface of the online membership platform; and generating the requested transactions based on the user input.

* * * * *